United States Patent Office 3,164,579
Patented Jan. 5, 1965

3,164,579
THIOUREA ADDUCTS OF DIMETHYL-
NAPHTHALENES
Charles L. Thomas, Swarthmore, Pa., assignor to Sun Oil
Company, Philadelphia, Pa., a corporation of New
Jersey
No Drawing. Filed Nov. 3, 1960, Ser. No. 66,929
8 Claims. (Cl. 260—96.5)

This invention relates to the formation of solid addition complexes, or adducts, of thiourea with dimethylnaphthalenes, and in particular with 2,6-dimethylnaphthalene and 2,7-dimethylnaphthalene.

Previously, addition complexes of thiourea with isoparaffins and cycloparaffins have been formed, but thiourea has not been recognized as suitable for the formation of complexes with naphthalene or its simple derivatives.

It has now been found that thiourea forms addition complexes with at least some dimethylnaphthalenes and that the formation is selective for the formation of complexes with certain of the isomeric dimethylnaphthalenes. This selective nature of the complex formation makes it possible to concentrate the various isomers in a mixture and thereby provide a useful separation of isomers. Prior to the present invention, the possibility of such complex formation and such separation was not recognized.

The separation of isomeric dimethylnaphthalenes is useful in the provision of concentrated isomers for various purposes. For example, 2,6-dimethylnaphthalene is particularly useful for oxidation to 2,6-naphthalene dicarboxylic acid, which in turn is useful for reaction with glycol compounds to form solid polyesters. The properties of the polymers formed from the 2,6-diacid are superior in some respects to those of the polymers formed from the isomers, and separation of the 2,6 isomer from other isomers with which it is often associated is therefore desirable.

Various other separations of individual isomers of dimethylnaphthalenes are useful for various purposes, and the present invention provides a novel manner of obtaining such separations.

According to the present invention, thiourea is contacted with a dimethylnaphthalene to form a complex of the thiourea with the dimethylnaphthalene, and the resulting complex is isolated. A composition of matter is thereby obtained which comprises a crystalline complex of the thiourea and the dimethylnaphthalene.

The formation of a solid complex occurs either directly upon contacting of the components, or upon cooling of the mixture obtained by the contacting. In one embodiment, the solid complex is formed in an excess of a liquid which does not form a solid complex with thiourea, and the resulting mixture is treated for separation of the solid complex from the liquid material. Conventional separation techniques such as filtration, centrifuging etc. can be employed.

In one embodiment, the thiourea is added as a solution in a solvent. Examples of suitable solvents are alkanols having up to 3 carbon atoms per molecule. Methanol is a preferred solvent, but ethanol and propanols are operable. Anhydrous solvents, or aqueous solvents containing for example up to 25 volume percent of water or more, can be employed. Other solvents which can be used are dialkyl ketones containing up to 4 carbon atoms, i.e. acetone and methyl ethyl ketone. Other suitable known solvents can be used. The thiourea can be used as a solution in the solvent, or as a solid granular material wetted with the solvent. In some cases, the use of an added solvent for the thiourea is not essential.

It has been found that 2,6- and 2,7-dimethylnaphthalene each forms a complex with thiourea more readily than the alkyl naphthalene isomers of 2,6- and 2,7-dimethylnaphthalene. It is therefore possible to concentrate 2,6-dimethylnaphthalene or 2,7-dimethylnaphthalene from a mixture thereof with other isomers, by selectively complexing the 2,6 or 2,7 isomer with thiourea, separating the solid complex from the mother liquor and decomposing the separated complex by known techniques, to recover separately the thiourea and the concentrated 2,6- or 2,7-dimethylnaphthalene.

In addition to concentration of 2,6- and 2,7-dimethylnaphthalene relative to their isomers, selective complexing of thiourea with other individual alkyl naphthalenes having two acyclic carbon atoms, e.g. 2,3-dimethylnaphthalene and others, relative to their isomers, may be obtained in some cases. The determination of suitable conditions for such complexing to effect a desired concentration is within the ability of a person skilled in the art in the light of the present specification.

In one embodiment, the process involves contacting a mixture containing 2,6- or 2,7-dimethylnaphthalene and an alkyl naphthalene other than 2,6- or 2,7-dimethylnaphthalene, having two acyclic carbon atoms, with thiourea to form solid adducts with the 2,6- or 2,7-dimethylnaphthalene, and separating the resulting adducts.

This procedure is preferably performed in the presence of a hydrocarbon solvent which does not form a complex with thiourea. Such solvent may be a normal paraffinic solvent which is added to the starting material for that purpose; aromatic hydrocarbons which do not form complexes with thiourea can also be employed. Frequently the feed stock normally contains hydrocarbons which do not form complexes with thiourea, and addition of a hydrocarbon is therefore unnecessary. This is generally the case with feed stocks which are products of conversion of petroleum, e.g. recycle stocks obtained in the catalytic cracking of gas oil to form gasoline; higher boiling products obtained in the catalytic reforming of straight run naphtha to produce reformed gasoline; etc.

Upon separation of the solid complexes from the liquid material, the complex can be decomposed by known techniques to recover the hydrocarbon from the complex. A typical procedure involves contacting the complex with water at an elevated temperature, with subsequent separation of an aqueous solution of thiourea from the dimethylnaphthalene liberated from the complex. Various other decomposition procedures are known in the art of thiourea complex formation, and the known procedures are generally suitable for use according to the invention. The known procedures for decomposition include those which are disclosed in Patent No. 2,499,820 which issued to Lloyd C. Fetterly on March 7, 1950.

The hydrocarbon which is recovered from the complex is concentrated with respect to at least one of the components of the feed stock. Further concentration of such component can be obtained by the performing of additional stages of thiourea complexing, separation and decomposition. The techniques disclosed in the Fetterly patent referred to above are generally suitable in this connection. The process of the invention can also be used in conjunction with other procedures for concentration of dimethylnaphthalene isomers, with isomerization processes, etc.

In one embodiment, the invention involves the use as feed stock of a mixture containing 5 to 25 wt. percent of 2,6-dimethylnaphthalene, 5 to 25 wt. percent of 2,7-dimethylnaphthalene and 50 to 90 wt. percent of components selected from the group consisting of 2,3-dimethylnaphthalene, monoethylnaphthalenes (i.e. 1-ethylnaphthalene) and 1,$x$-dimethylnaphthalenes where $x$ is an integer from 2 to 8.

Typically the amount of thiourea employed in the process of the invention is in the range from 2 to 10 moles, per mole of 2,6-dimethylnaphthalene or of 2,7-dimethylnaphthalene or of mixture of 2,6- and 2,7-dimethylnaphthalene. Other amounts can be employed if desired. The thiourea is preferably employed as a concentrated solution in methanol, the concentration preferably being at least 50% of the saturation concentration.

Thiourea is preferably contacted with the dimethylnaphthalene at a temperature in the range from 0 to 75° C., although other temperatures can be employed in some cases. The subsequent separation of the complex which is formed can be performed either at the same temperature as the initial contacting, or at some other temperature, usually a lower temperature. Preferably the temperature of the separation is in the range from −25° C. to 25° C., and more preferably above −10° C., although other temperatures can be employed in some cases.

The invention is generally applicable to feed stocks which contain substantial amounts of dimethylnaphthalenes, whether from petroleum, coal tar or other sources.

Any suitable method can be employed for the contacting of the thiourea with the dimethylnaphthalene, and the procedures disclosed in the Fetterly patent referred to above are generally suitable.

The following example illustrates the invention.

A dimethylnaphthalene concentrate obtained from a 480 to 515° F. fraction of a petroleum conversion product containing substantial amounts of dimethylnaphthalenes was employed as the feed stock for this example. The petroleum conversion product had previously been obtained by the catalytic reforming of petroleum naphtha, followed by thermal cracking of the reformed naphtha, according to known procedure. The recovery of the concentrate from the conversion product was accomplished by azeotropic distillation of the 480 to 515° F. fraction of the conversion product.

The analysis of the dimethylnaphthalene concentrate was as follows, "EtN" referring to ethylnaphthalene and "DMN" referring to dimethylnaphahalene.

| | Wt. percent |
|---|---|
| 2-EtN | 4.5 |
| 2,6-, 2,7-DMN, 1-EtN | 25.4 |
| 1,6-, 1,7- 1,3-DMN | 40.1 |
| 2,3-, 1,4-DMN | 12.7 |
| 1,5-, 1,2-DMN | 2.7 |
| 1,8-DMN | 1.8 |
| Other aromatics | 12.8 |

The 1-ethylnaphthalene concentration was 1–2%, and the ratio of 2,6-dimethylnaphthalene to 2,7-dimethylnaphthalene was about 1.2. Therefore the 2,6-dimethylnaphthalene concentration and the 2,7-dimethylnaphthalene concentration were about 13 and 11% respectively.

A 10.0 gram portion of the above concentrate was added to 100 ml. of a saturated solution of thiourea in anhydrous methanol, the amount of thiourea being 11.7 grams. The addition was at room temperature, and formation of a crystalling precipitate was observed almost immediately. After standing for 4 hours, the precipitate was filtered at room temperature. After drying, the solid weighed 1.75 grams. Another crop of crystals weighing 1.80 grams was obtained at room temperature from the mother liquor on standing overnight.

The filtrate was then cooled in an ice-bath to obtain another crop weighing 3.2 grams. After standing for 2–3 hours in the ice-bath, an additional 0.8 gram of precipitate was obtained.

The filtrate was then cooled to −22° C. for several days to obtain 2 crops weighing 2.6 grams and 1.5 grams respectively.

After filtration of these last two crops, the filtrate was evaporated to dryness, the residual oil was treated with warm water, and the water-insoluble dimethylnaphthalenes were extracted with ether and dried over anhydrous potassium carbonate. Evaporation of ether left an oily residue weighing 5.5 grams and having the following composition:

| | Percent |
|---|---|
| 2-EtN | 7.4 |
| 2,6-, 2,7-DMN, 1-EtN | 14.2 |
| 1,6-, 1,7-, 1,3-DMN | 54.3 |
| Other aromatics | 24.1 |

The various crops of crystalline adducts of thiourea and dimethylnaphthalene, obtained as described above, were combined to give the following fractions: Fraction 1, crystallized at room temperature, weighed 3.55 grams and contained 0.5 gram of dimethylnaphthalenes. Fraction 2 which was crystallied at 0 to 5° C. weighed 4.0 grams and contained 0.8 gram of dimethylnaphthalenes. Fraction 3 which was crystallized at −22° C. weighed 4.1 grams and contained 1.4 grams of dimethylnaphthalenes.

Each individual fraction was treated with warm water, and the water-insoluble oil was extracted with ether to obtain extracts which were dried over anhydrous potassium carbonate. Removal of the ether left crystalline dimethylnaphthalene residues having the following analyses:

| Fraction | Wt. (g.) | Analysis | | |
|---|---|---|---|---|
| | | Percent 2,6-DMN | Percent 2,7-DMN | Other |
| 1 | 0.5 | 29.8 | 22.5 | 47.7 |
| 2 | 0.8 | 29.4 | 18.8 | 51.8 |
| 3 | 1.4 | 22.3 | 27.2 | 50.5 |

The data obtained above are summarized in the following table, which compares the concentrations of 2,6-dimethylnaphthalene and of 2,7-dimethylnaphthalene in the feed stock with the concentrations of those hydrocarbons in the dimethylnaphthalene residues recovered from the crystals obtained at the indicated temperatures.

| | Percent 2,6-DMN | Percent 2,7-DMN |
|---|---|---|
| Feedstock | 13 | 11 |
| Complexed hydrocarbon: | | |
| Crystallized at room temp | 29.8 | 22.5 |
| Crystallized at 0 to 5° C | 29.4 | 18.8 |
| Crystallized at −22° C | 22.3 | 27.2 |

The table shows that the treatment with thiourea to precipitate adducts resulted in a very substantial concentration of both 2,6- and 2,7-dimethylnaphthalene in the adducts as compared with the feed stock.

In order to show the effect of the presence of thiourea, the above procedure was repeated under identical conditions except for the omission of thiourea. No crystalline precipitate of dimethylnaphthalene was formed either at room temperature or at 0° C.

The invention claimed is:

1. Process for concentrating dimethylnaphthalene isomers which comprises: contacting a mixture of (1) a hydrocarbon material selected from the group consisting of 2,6 - dimethylnaphthalene, 2,7 - dimethylnaphthalene and mixtures of 2,6-dimethylnaphthalene and 2,7 - dimethylnaphthalene and (2) a dimethyl naphthalene isomer of said hydrocarbon material, with thiourea to form a solid adduct with said hydrocarbon material; and separating said adduct.

2. Process according to claim 1 wherein said adduct is subsequently decomposed to recover said hydrocarbon.

3. Process according to claim 2 wherein said mixture contains 5 to 25 wt. percent of 2,6-dimethylnaphthalene, 5 to 25 wt. percent of 2,7-dimethylnaphthalene and 50 to 90 wt. percent of components selected from the group consisting of 1,$x$-dimethylnaphthalene where $x$ is an integer from 2 to 8, 2,3-dimethylnaphthalene, and monoethylnaphthalenes.

4. Process according to claim 3 wherein the hydrocarbon recovered from said adduct comprises a concentrate of 2,6-dimethylnaphthalene and 2,7-dimethylnaphthalene, wherein said concentrate is contacted with additional thiourea to form a solid adduct with components of said concentrate, and wherein the latter adduct is separated and decomposed to recover further concentrated hydrocarbon.

5. Process according to claim 1 wherein said mixture is contacted with 2 to 10 moles of thiourea per mole of said hydrocarbon, said thiourea being employed in an at least 50% saturated methanol solution.

6. Process according to claim 5 wherein said adduct is separated by filtration at a temperature in the range from −25° C. to 25° C.

7. Process according to claim 6 wherein said adduct is formed by contacting said mixture and said thiourea at a temperature in the range from 0 to 75° C.

8. Process according to claim 1 wherein said thiourea is employed as a solid granular material moistened with a solvent selected from the group consisting of methanol and acetone.

References Cited in the file of this patent
UNITED STATES PATENTS

| | | |
|---|---|---|
| 2,520,716 | Fetterly | Aug. 29, 1950 |
| 2,588,506 | Fetterly | Mar. 11, 1952 |
| 2,737,508 | Axe | Mar. 6, 1956 |
| 2,903,441 | Bethea | Sept. 8, 1959 |

OTHER REFERENCES

Schlenk Jr.: Annalen Der Chemie, Justus Liebig's, vol. 573 (1951), pp. 142, 152 and 159 Q.D. 1 L7.

Schiessler et al.: J. Am. Chem. Soc., vol. 74, No. 7 (April 5, 1952), pp. 1720–1723.